(12) United States Patent
Meissner et al.

(10) Patent No.: US 6,413,295 B2
(45) Date of Patent: *Jul. 2, 2002

(54) IRON PRODUCTION METHOD OF OPERATION IN A ROTARY HEARTH FURNACE AND IMPROVED FURNACE APPARATUS

(75) Inventors: David C. Meissner, Charlotte, NC (US); Glenn E. Hoffman, Lancaster, SC (US); Kyle J. Shoop, Charlotte, NC (US); Takuya Negami, Tokyo (JP); Akira Uragami, Hyogo (JP); Yasuhiro Tanigaki, Kanagawa (JP); Shuzo Ito, Hyogo (JP); Isao Kobayashi, Hyogo (JP); Osamu Tsuge, Hyogo (JP); Koji Tokuda, Hyogo (JP); Shoichi Kikuchi, Hyogo (JP)

(73) Assignee: Midrex International B.V. Rotterdam, Zurich Branch (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/266,989

(22) Filed: Mar. 12, 1999

Related U.S. Application Data

(60) Provisional application No. 60/108,045, filed on Nov. 12, 1998.

(51) Int. Cl.$^7$ .............................................. C21B 13/10
(52) U.S. Cl. ......................... 75/484; 75/500; 266/177; 266/190
(58) Field of Search ................... 75/484, 500; 266/177, 266/190

(56) References Cited

U.S. PATENT DOCUMENTS

| | | | |
|---|---|---|---|
| 1,885,381 A | 11/1932 | Simpson | |
| 2,072,072 A | 2/1937 | Hartgen | |
| 3,443,931 A | 5/1969 | Beggs et al. | |

(List continued on next page.)

FOREIGN PATENT DOCUMENTS

| EP | 692543 | | 1/1996 |
|---|---|---|---|
| EP | 0 969 105 | | 1/2000 |
| JP | 8-27507 | | 1/1996 |
| JP | 10-204516 | | 8/1998 |
| WO | WO 97/34018 | | 9/1997 |
| WO | WO 99/20801 | | 4/1999 |
| WO | 99/20801 | * | 4/1999 |

*Primary Examiner*—Melvyn Andrews
(74) *Attorney, Agent, or Firm*—Dougherty & Clements LLP

(57) ABSTRACT

The present invention is an apparatus and method for the direct reduction of iron oxide utilizing a rotary hearth furnace to form a high purity carbon-containing iron metal button. The hearth layer may be a refractory or a vitreous hearth layer of iron oxide, carbon, and silica compounds. Additionally, coating materials may be introduced onto the refractory or vitreous hearth layer before iron oxide ore and carbon materials are added, with the coating materials preventing attack of the molten iron on the hearth layer. The coating materials may include compounds of carbon, iron oxide, silicon oxide, magnesium oxide, and/or aluminum oxide. The coating materials may be placed as a solid or a slurry on the hearth layer and heated, which provides a protective layer onto which the iron oxide ores and carbon materials are placed. The iron oxide is reduced and forms molten globules of high purity iron and residual carbon, which remain separate from the hearth layer. An improved apparatus includes a cooling plate that is placed in close proximity with the refractory or vitreous hearth layer, cooling the molten globules to form iron metal buttons that are removed from the hearth layer. The improvements due to the present apparatus and method of operation provide high purity iron and carbon solid buttons, which are separate from slag particulates, and discharged without significant loss of iron product to the interior surfaces of the furnace.

34 Claims, 4 Drawing Sheets

U.S. PATENT DOCUMENTS

| | | | |
|---|---|---|---|
| 3,947,621 A | * | 3/1976 | Collin et al. ............... 75/10.15 |
| 4,597,564 A | | 7/1986 | Hanewald et al. |
| 4,622,905 A | | 11/1986 | MacDougall et al. |
| 4,676,741 A | | 6/1987 | Pargeter |
| 4,701,214 A | | 10/1987 | Kaneko et al. |
| 5,186,741 A | | 2/1993 | Kotraba et al. |
| 5,601,631 A | | 2/1997 | Rinker et al. |
| 5,637,133 A | | 6/1997 | Munnix et al. |
| 5,730,775 A | | 3/1998 | Meissner et al. |
| 5,782,957 A | | 7/1998 | Rinker |
| 5,885,521 A | | 3/1999 | Meissner et al. |
| 6,036,744 A | | 3/2000 | Negami et al. |
| 6,126,718 A | | 10/2000 | Sana et al. |
| 6,135,766 A | | 10/2000 | Takeda et al. |
| 6,210,462 B1 | | 4/2001 | Kikuchi et al. |
| 6,210,562 B1 | * | 4/2001 | Kikuchi et al. ............... 75/485 |

* cited by examiner

Fig. 6
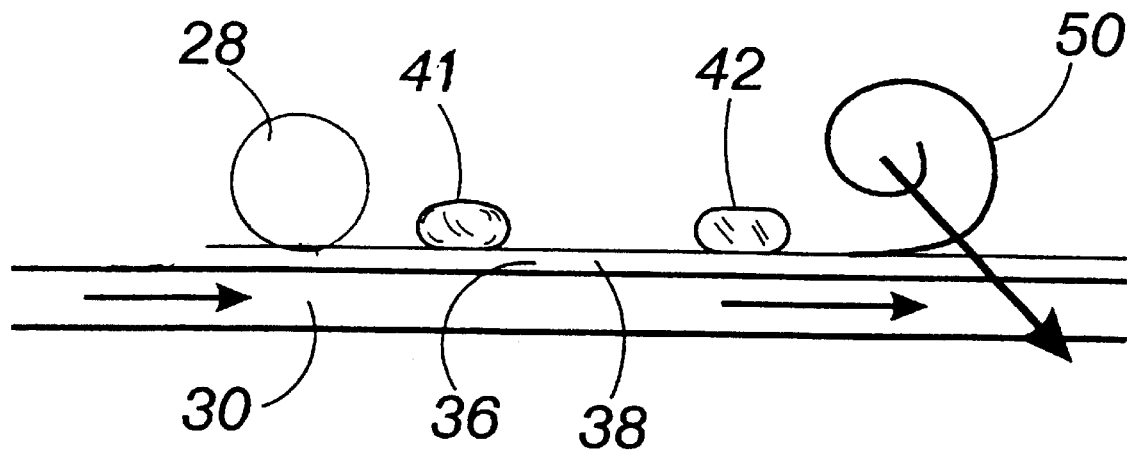
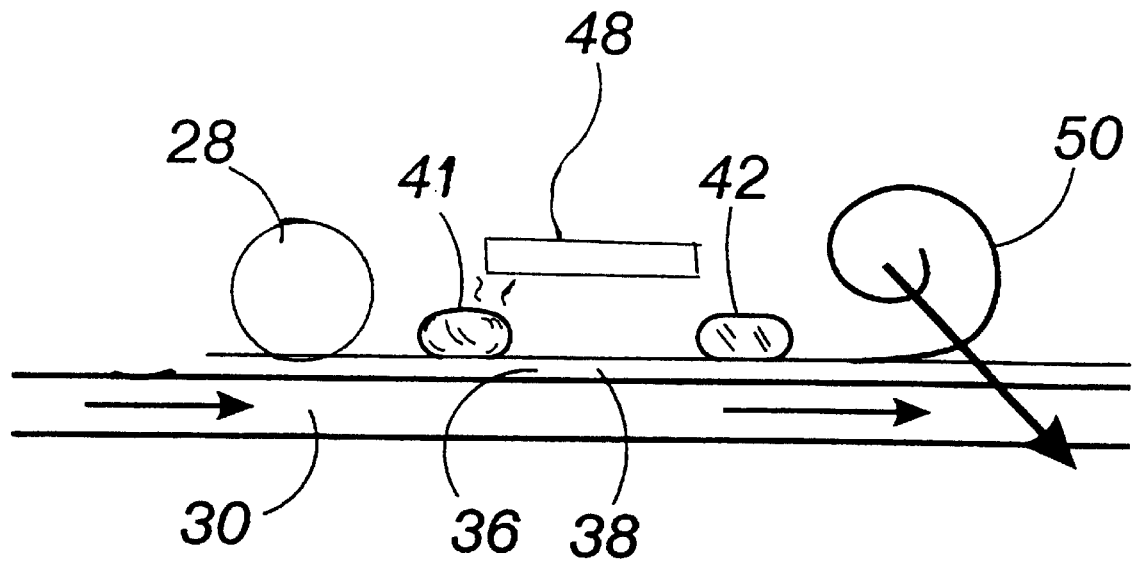
Fig. 7

1

IRON PRODUCTION METHOD OF OPERATION IN A ROTARY HEARTH FURNACE AND IMPROVED FURNACE APPARATUS

CROSS-REFERENCE TO RELATED APPLICATION

This application claims the benefit of U.S. Provisional Application No. 60/108,045, filed on Nov. 12, 1998.

FIELD OF INVENTION

This invention relates to an apparatus and method for operation of an ore processing furnace for improved processing of iron oxide reduction. More particularly, this invention relates to the method of operation of a furnace for production of high purity iron and an improved furnace apparatus for iron reduction.

BACKGROUND OF THE INVENTION

In 1987, Midrex received U.S. Pat. No. 4,701,214, that taught reduction in a rotary hearth furnace and a method of operation which required less energy and a smaller smelting furnace by introducing reductant gases and fuel into the rotary hearth furnace.

All major steelmaking processes require the input of iron bearing materials as process feedstocks. For a steelmaking method utilizing a basic oxygen furnace, the iron bearing materials are usually blast furnace hot metal and steel scrap. A broadly used iron source is a product known as Direct Reduced Iron ("DRI") which is produced by the solid state reduction of iron ore without the formation of liquid iron. DRI and/or steal scrap are also used for steelmaking utilizing the electric arc furnace.

Improvements are sought within the industry for furnace modifications and improved methods of operation that provide for efficient production of high purity iron with low carbon (<5%) material in which iron oxides are efficiently reduced into purified iron on a hearth surface while slag components are separated from purified iron at increased temperatures.

In 1998, Midrex International received U.S. Pat. No. 5,730,775, that teaches an improved method known by the trade name or trademark of FASTMET™, and apparatus for producing direct reduced iron from dry iron oxide and carbon compacts that are layered no more than two layers deep onto a rotary hearth, and are metallized by heating the compacts to temperatures of approximately 1316° to 1427° C., for a short time period. For a general understanding of the recent art, U.S. Pat. No. 5,730,775 is herein incorporated by reference.

SUMMARY OF INVENTION

In the direct reduction of iron oxide in furnaces, this invention improves the utilization of a rotary hearth furnace using a method for producing high purity iron product from iron oxide feed material containing carbon compounds, including the steps of providing a rotary hearth furnace having a hearth layer which consists of a refractory layer or a vitreous hearth layer formed by placing iron oxide, carbon, and silica compounds on the sub-hearth layer; heating the iron oxide, carbon, and silica compounds forming a vitreous hearth layer; placing coating materials on the hearth surface to form a coated hearth layer; feeding iron oxide material into the furnace and onto the coated hearth layer; heating the iron oxide material on the coated hearth layer; reducing the iron oxide materials on the coated hearth layer; forming liquid iron and carbon globules on the coated hearth layer, with separated slag materials; cooling the iron and carbon globules with a cooling surface, creating a solid button of iron and carbon product; and discharging iron and carbon product and slag material from the furnace. An improved apparatus includes a rotary hearth furnace having a cooling plate that is placed in close proximity with the hearth layer or refractory surface, the cooling plate cools the iron globules to form solid high purity iron and low carbon buttons that are removed from the vitreous hearth layer. The improvements due to the present apparatus and method of operation are providing high purity iron and low carbon buttons which are separated from the slag particulates, discharging the buttons from the furnace without significant loss of high purity iron in the hearth furnace, and generating iron buttons with iron content of approximately 95% or greater, and carbon content of approximately 5% or less in the discharged buttons of iron material.

OBJECTS OF THE INVENTION

The principal object of the present invention is to provide a method of achieving efficient production of high purity iron having concentrations of carbon of 1% to 5% therein at elevated temperatures in a rotary hearth furnace with separation of slag components from the purified iron on the hearth surface at high temperatures.

Another object of the invention is to provide a method of achieving efficient reduction of iron oxide at elevated temperatures in a processing and reducing furnace.

An additional object of the invention is to provide an improved furnace apparatus for providing high purity iron and cooling the high purity iron on the hearth layer surface to facilitate separation of slag components within the furnace.

The objects of the invention are met by a method for producing direct reduced purified iron at elevated temperatures within a furnace, including the step of providing a rotary hearth furnace having a sub-hearth layer, and introducing conditioning materials of iron oxide, carbon, and silica compounds with heating of conditioning materials to form a vitreous layer onto which agglomerates of iron oxide containing carbon are placed. The step of heating the conditioning materials proceeds the step of reducing by heating the agglomerated iron oxide and carbon, at a specified temperature, and reducing the iron oxide. The molten globules of purified iron are separated from slag components on the hearth layer surface within the furnace. A cooling step follows the separating step, where globules of purified iron are cooled within the furnace by placing a cooling apparatus in close proximity to the hearth layer, with the resulting step of solidification of purified iron within the furnace, and the remaining step of discharging the purified iron from the furnace free of solidified slag, which may be discharged separately from the furnace.

The objects of the invention are also met by an apparatus for producing direct reduced iron at elevated temperatures within a rotary hearth furnace having a non-reactive hearth surface made by the placement of coating materials and agglomerates of iron oxide and carbon onto the surface of the hearth layer. The hearth layer may include a vitreous layer of iron oxide and silica compounds formed before the agglomerates of iron oxide and carbon are placed onto the vitreous or the refractory layer. The coating materials and agglomerates of iron oxide and carbon are heated to a specified temperature. The iron oxide is reduced followed by separation into globules of purified iron from the slag components and coating materials on the hearth layer. The purified iron is solidified by passage of the liquid iron globules in close proximity to a means for cooling above the hearth layer consisting of exposure to cooled apparatus placed close to the hearth layer or refractory surface. After passage past the means for cooling on the hearth layer or refractory surface, the purified and solidified iron and low carbon buttons are removed from the hearth layer for collection outside of the rotary hearth furnace separate from slag particulates formed within the furnace.

BRIEF DESCRIPTION OF THE DRAWINGS

The foregoing and other objects will become more readily apparent by referring to the following detailed description and the appended drawings in which:

FIG. 6 is an isometric side view of the liquid purified iron and low carbon globules on the hearth layer surface, separate from slag particles, specific to the present invention;

FIG. 7 is an isometric side view of a means for cooling the liquid purified iron and low carbon globules, with the means for cooling placed in close proximity to the hearth layer surface, specific to the present invention.

DESCRIPTION OF PREFERRED EMBODIMENTS

Figure 1:
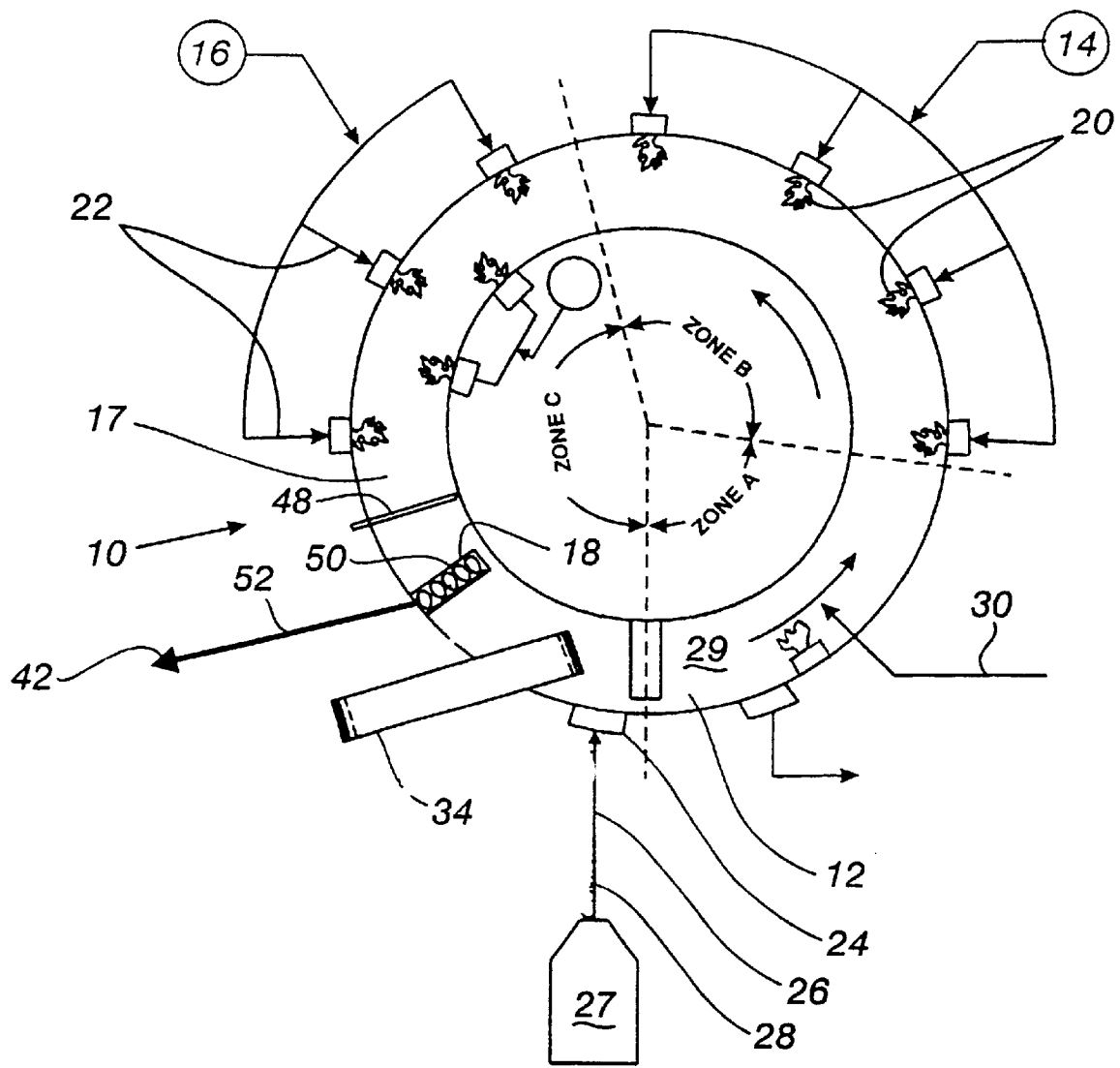
FIG. 1 is a top view of a rotary hearth furnace for the reduction of iron oxide and production of molten iron globules that utilizes a hearth layer surface and a means for cooling purified iron and low carbon globules within the furnace.

Referring now to the drawings, and more particularly to FIG. 1, a direct reduction furnace 10 is utilized for reducing iron oxide feed material. The furnace, such as a rotary hearth furnace (RHF) 10 has dimensions of a typical hearth furnace utilized in the iron production industry with an active hearth width of approximately 1 m to approximately 7 m width, or wider. The RHF 10 has a refractory layer surface or vitreous hearth layer surface 30 that is rotatable from a feed material zone 12, through approximately two or three burner zones 14, 16, 17, a reaction zone 17 and discharge zone 18 (see FIG. 1). The refractory layer surface or vitreous hearth layer surface 30 is rotatable in a repetitive manner from the discharge zone 18 to the feed material zone 12, and through the zones 12, 14, 16, 17, 18 for continuous operation. The burner zones 14, 16 17 are each fired by a plurality of air/fuel, oil fired, coal fired, or oxygen enriched burners 20, 22.

The feed material zone 12 includes an opening 24 and a feed mechanism 26 by which iron oxide and carbon agglomerates 28, also called iron oxide "greenballs", are charged. An initial layer of iron oxide, carbon materials, and silica (silicon oxide), may be placed on the refractory sub-hearth to form a vitreous layer 30 on which the iron oxide agglomerates 28 are placed. Coating materials 36 placed on the refractory layer surface or vitreous hearth layer surface 30 may include iron oxide compounds, silica compounds, and carbon compounds. The materials may be placed by spray injector 32, or by solid material conveyor 34. The agglomerates 28 are leveled to a preferred height above the refractory surface or hearth layer surface 30 by a leveler 29 that spans the width of the surface 30. The agglomerates 28 are continuously fed to the RHF 10 by the feed mechanism 26, as the surface 30 is rotated around the RHF 10, by a variable speed drive (not shown). Therefore the iron agglomerate retention time within the RHF 10, and within each zone 14, 16, 18, is controlled by adjusting the variable speed drive.

Located in the area of the feed material zone 12, and upstream of the feed mechanism 26 from feed hopper 27 for agglomerates 28, is a means for introducing 32, 34 coating materials 36 such as coal powder, silica, iron oxide compounds, graphite, and fines generated from raw iron oxide materials. At least one solid material conveyor 34 (FIG. 3) may introduce these coating materials 36, and additional coating compounds 38 in a separate layer onto the refractory layer surface or vitreous hearth layer surface 30. If the materials 36, 38 are fine particulates, materials 36, 38 may be mixed with a liquid carrier and applied by a spray injector 32.

Figure 2:
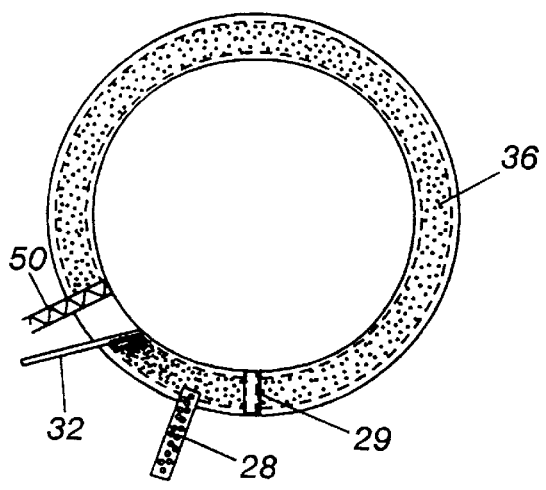
FIG. 2 is a top view of the spray introduction of coating material onto a hearth surface, forming a coated hearth layer, with iron oxide and carbon agglomerates placed on the coated hearth layer, specific to the present invention.
Figure 3:
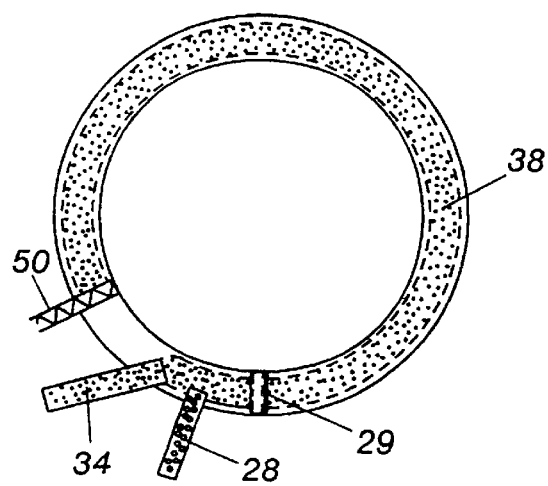
FIG. 3 is a top view of a solid placement of coating material onto a hearth layer surface, forming a coated hearth layer, with iron oxide and carbon agglomerates placed on the coated hearth layer, specific to the present invention.
Figure 4:
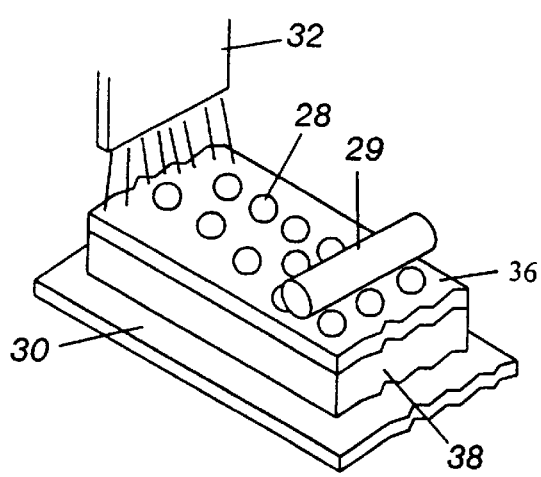
FIG. 4 is an isometric view of a plurality of coating materials sprayed onto and forming a coated hearth layer surface, onto which iron oxide and carbon agglomerates are placed and leveled, specific to the present invention.
Figure 5:
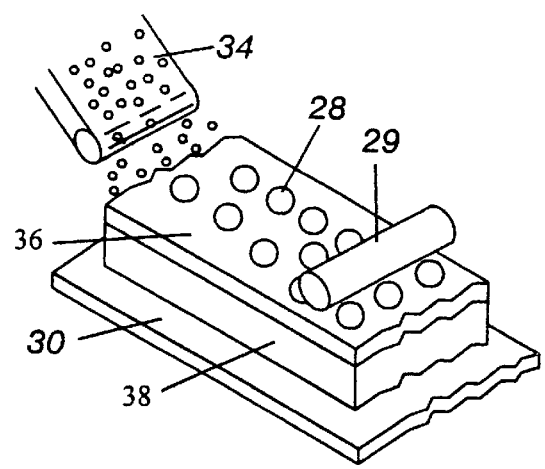
FIG. 5 is an isometric view of a plurality of solid coating materials containing a plurality of layers placed onto and forming a coated surface, onto which iron oxide and carbon agglomerates are placed and leveled, specific to the present invention.

The injector 32 may be cooled internally to allow introduction of the coating materials as fine particulates in a liquid spray for application on the surface 30 (FIG. 2). If the materials 36, 38 are placed in the RHF 10 without the liquid carrier, the conveyor 34 places the coating materials 36, and additional coating materials 38 as close to, and across the width of, the refractory layer or vitreous hearth layer 30 (FIG. 3).

The coating materials 36, may include iron oxide compounds, silica compounds, and carbon compounds. The additional coating compounds 38 may include any of the following compounds: iron oxide, silica, magnesium oxide (MgO), aluminum oxide ($Al_2O_3$), and silicon oxide ($SiO_2$), particulates generated from iron oxides reduction and melting, and carbonaceous materials. The coating materials 36, and compounds 38 may have a variable material size of less than 10 mm, or preferably approximately 1 mm, or less. The bulk density of coating materials 36, 38 may be approximately 0.5 $g/cm^3$, or greater. The thickness of the coating materials 36, 38 may be approximately 0.1 mm or greater.

The refractory layer surface or vitreous hearth layer surface 30 of the RHF, with the coating materials 36, and compounds 38 introduced onto the surface 30, may be heat treated at temperatures with hearth temperatures of approximately 1500° C. to approximately 1600° C. The preferred hearth temperature is approximately 1530° to approximately 1550° C. After rotation through the heating zones 14, 16, the coating materials 36, 38 are cooled. The cooling device may be a plate 48 having cooling liquid flowing internally, with the plate 48 positioned before the discharge zone 18. The plate 48 is in close proximity and spanning the width of the surface 30, to provide a zone of cooler temperatures near the surface 30.

The preferred combustion temperature in zone 17 (see FIG. 1), is approximately 1450° C. to approximately 1600° C. The iron oxide and carbon agglomerates 28 may be maintained at a temperature range of approximately 1400° C. to approximately 1500° C. The preferred temperature to maintain the iron oxide agglomerates 28 is approximately 1410° C. to approximately 1480° C.

The means for heating the surface 30, and coating materials 36, and additional compounds 38 thereon, may include either fuel burners or other devices for heating a RHF 10, located in the furnace enclosure of the burner zones 14, 16, or 17. The burner fuel includes fuel mixtures commonly utilized in the iron processing industry, such as coke oven gas, natural gas, fuel oil, and/or pulverized coal combusted with air or oxygen enriched air.

Other suitable devices for heating the hearth layer, coating materials, and additional compounds include a plurality of radiant heat sources, which may be substituted for burners 20, 22 in zones 14, 16, 17.

After the coating materials 36 and/or coating compounds 38 are introduced on surface 30, the placement of iron oxide and carbon agglomerates 28 and carbon onto the upper layers of surface 30, 36, 38 occurs by the means for placing iron oxide and carbon agglomerates 28 and other feed materials by feed mechanism 26, or other standard continuous or intermittent belt, or spiral conveyor of agglomerate sized materials (FIG. 1).

The iron oxide and carbon agglomerates 28 are heated and moved from the first zone 14, to a second zone 16, or a third zone if needed (not shown), on the rotatable layer 30. The reducing of iron oxide agglomerates 28 occurs in the burner zones 14, 16, and 17, the formation of molten iron globules and solidification of the globules occurs in a reaction zone also having a cooling device 48, at temperatures as specified above. During the reducing phase, the coating materials 36, 38, reduce the attack of the hearth layer 30. The coating compounds 38 provide a barrier to the highly reactive and purified liquid iron released by the iron oxide agglomerates 28, forcing the liquid iron to remain on the coated layer of the hearth layer 30.

The optimal intermediate phase of molten metal that is created in the method of operation of a RHF is the formation of liquid globules 41 of molten metal carbon and iron having approximately 95% iron and approximately 5% carbon in solution. The preferred intermediate phase of molten metal carbon and iron is approximately 95.5% to 97.5% iron and approximately 2.5% to 4.5% carbon in liquid globules 41 on the hearth surface 30.

A specific benefit of the coating compounds 38 introduced onto the surface 30, includes the creation of physically separated liquid globules 41 of iron/carbon, formed as the iron oxide and carbon agglomerates 28 reduce, melt and separate into iron/carbon globules 41 and separate slag and gangue regimes (not shown). The iron/carbon globules 41 form within the agglomerates 28 or outside the agglomerates on the hearth layer surface 30, and form molten purified iron/carbon globules 41 within burner zones 14, 16 and/or the reaction zone 17. The molten globules 41 of iron/carbon remain isolated from the slag and gangue regimes on the hearth layer surface 30, and the globules 41 are not absorbed into the hearth layer surface 30 due to prior coating of the surface 30. Therefore, solidified buttons 42 of highly purified solid iron product (greater than 95% iron), may be recovered from the discharge zone 18, without contamination by other gangue particulate or slag materials on the hearth surface 30, or on other interior surfaces of the RHF 10.

The coated layer of materials 36, and coating compounds 38 may be rejuvenated by the periodic or continuous introduction of additional coating materials 36, 38 during processing cycles of the RHF 10 when the molten iron buttons 42 are discharged, and before the iron oxide and carbon agglomerates 28 are placed onto the hearth layer surface 30.

Figure 8:
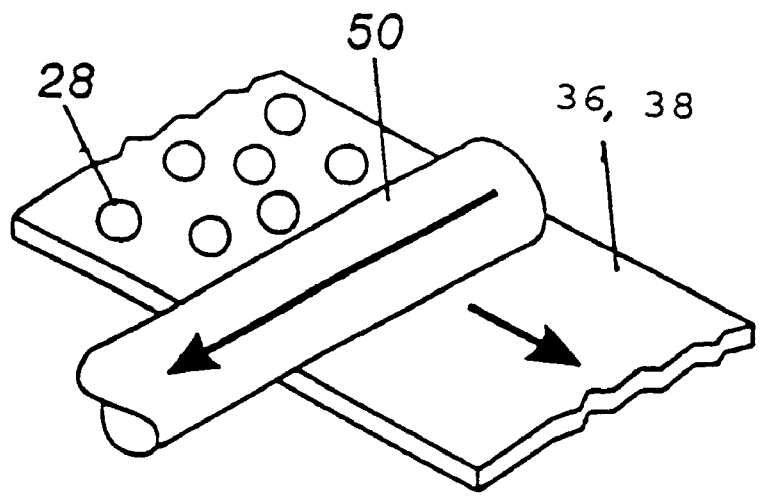
FIG. 8 is an isometric view of a discharge mechanism for removing purified iron and low carbon buttons from the hearth layer surface, specific to the present invention.

Reduced and purified iron material in the form of iron buttons 42 containing low concentrations of carbon are removed from the discharge zone 18 by a means for removing materials from a rotatable surface by a standard discharge mechanism, such as a discharge conveyor 50, such as a continuous or intermittent belt, screw, or spiral conveyor, located above the surface 30 (FIG. 8). The purified iron metal buttons 42, after separation by cooling from residual slag, is of a higher purity and a higher carbon content than that produced by prior hearth furnace technologies such as FASTMET™.

ALTERNATIVE EMBODIMENTS

In an alternative operation of the RHF 10, a vitreous iron oxide and silica layer 36, and conditioning material layer 38 may have been previously formed as hearth layer 30. The vitreous iron oxide and silica hearth layer 30 assists with inhibiting the attack of the iron globules 41 on the hearth layer.

In an alternative embodiment, coating materials 38 such as iron oxide, silica, magnesium oxide (MgO), aluminum oxide ($Al_2O_3$), and silicon oxide ($SiO_2$), coal powder, and carbon particulates generated from iron oxides reduction and melting, may be added to the surface 30. After rotation through the heating zones 14, 16, 17, the coating compounds 38 are cooled. The cooling device may be a plate 48 having cooling liquid flowing internally, with the plate 48 positioned before the discharge zone 18. The plate 48 is in close proximity and spanning the width of the hearth layer surface 30, to provide a zone of cooler temperatures near the surface of the hearth layer.

In another alternate embodiment, carbonaceous coating material 38, may be placed on the hearth layer surface 30 to form a separate carbon layer (not shown). The carbonaceous material 38 serves as a non-reactive sacrificial carbon layer which promotes formation of molten iron globules 41 (see FIG. 6), and solidified iron buttons 42 without the globules 41 or the buttons 42 attacking into the hearth layer 30. By keeping the globules 41 or the buttons 42 separated from the slag particulates and the hearth layer 30, high purity iron of approximately 95% content, and residual carbon of approximately 5% may be produced.

SUMMARY OF THE ACHIEVEMENT OF THE OBJECTS OF THE INVENTION

From the foregoing, it is readily apparent that we have invented an apparatus and method of operation for efficiently producing increased volumes and a higher purity of solid iron and low carbon product from rotary hearth furnaces without significant increases in costs, processing time, or excessive furnace temperatures. The invention achieves significantly higher quality of purified solid iron and low carbon product by adding the specified coating materials to form either a protective hearth layer 30 of iron oxide, silica, aluminum, MgO or silicate compounds, and/or carbon compounds on the hearth layer surface 30. The layers of materials of varying compositions 36, 38 are formed by adding the coating materials prior to adding the iron oxide and carbon agglomerates onto the rotatable refractory hearth surface 30 (see FIG. 7).

The observed improvements due to the described invention are due to the conditions that at normal furnace temperatures the coating materials may form a protective layer 38 attached onto or on a refractory or vitreous layer 30, thereby preventing the purified solid iron and low carbon product from coating the surface of the refractory layer or vitreous hearth layer 30. Such a coating or bonding condition makes it difficult to remove or discharge the purified solid iron and low carbon product from the furnace. The present invention, as claimed below, solves this problem of loss of purified iron and low carbon product within the RHF 10.

The invention has been described in detail, with reference to certain preferred embodiments, in order to enable the reader to practice the invention without undue experimentation. It is to be understood that the foregoing description and specific embodiments are merely illustrative of modes of the invention and the principles thereof, and that various modifications and additions may be made to the apparatus by those skilled in the art, without departing from the spirit and scope of this invention.

What is claimed is:

1. A method for producing solid iron and carbon product from iron oxide material containing carbon compounds, comprising the steps of:
   (a) providing a rotary hearth furnace, having a hearth layer surface;
   (b) feeding agglomerates containing iron oxide and carbon materials onto said hearth layer surface;
   (c) heating said agglomerates containing iron oxide and carbon materials;
   (d) reducing said agglomerates containing iron oxide and carbon materials;
   (e) forming liquid iron and carbon globules and slag particulates on said hearth layer surface, said globules separating from said slag particulates;
   (f) cooling said liquid iron and carbon globules with a cooling surface, creating solid iron and carbon buttons;
   (g) discharging solid iron and carbon buttons from said furnace; and
   (h) removing slag particulates from said furnace.

2. The method of claim 1, wherein said step of providing a rotary hearth furnace further comprises applying iron oxide, carbon, and silica compounds to said hearth layer surface, forming a vitreous layer on said hearth layer surface.

3. The method of claim 1, wherein said step of providing a rotary hearth furnace further comprises introducing coating materials on said hearth layer surface, said coating materials selected from the group consisting essentially of magnesium oxide compounds, silicon oxide compounds, aluminum oxide compounds, iron oxide compounds, and carbon compounds.

4. The method of claim 1 wherein said heating step further comprise heating said iron oxide and carbon materials with a plurality of radiant heat sources at temperatures of at least 1450° C. to about 1600° C. inside said furnace.

5. The method of claim 1 wherein said reducing step further comprises reducing said iron oxide and carbon materials with a plurality of radiant heat sources at temperatures of at least 1450° C. to about 1540°60 C. inside said furnace.

6. The method of claim 1 wherein said reducing step further comprises heating said materials with a plurality of radiant heat sources at temperatures of at least 1400° C. to about 1500° C. at said hearth layer surface.

7. The method of claim 1 wherein said reducing step further comprises heating said iron oxide and carbon materials with a plurality of radiant heat sources at temperatures of at least 1410° C. to about 1480° C. at said hearth layer surface.

8. The method of claim 2 wherein said feeding step further comprises introducing said iron oxide and carbon materials onto said vitreous layer having iron oxide, carbon, and silica compounds.

9. The method of claim 1 wherein said cooling step further comprises providing a cooling surface near said hearth layer surface, said surface cooling said liquid iron and carbon globules, creating a solid button of iron and carbon on said hearth surface before said discharging step.

10. An apparatus for direct reduction of iron oxide material containing carbon compounds to a solid iron and carbon product, comprising:
    (a) a furnace, said furnace having an interior hearth layer of refractory material;
    (b) means for introducing a mixture of coating materials onto said hearth layer;
    (c) means for placing agglomerates containing iron oxide and carbon materials onto said hearth layer or said refractory layer;
    (d) means for heating said hearth layer, said coating materials, and said agglomerates containing iron oxide and carbon materials;
    (e) means for reducing said iron oxide and carbon materials with the formation of liquid iron and carbon globules and slag particulates, said globules separate from said slag particulates;
    (f) means for cooling said liquid iron and carbon globules on said hearth layer with the formation of a solid iron and carbon button;
    (g) means for removing said solid iron and carbon button from said furnace; and
    (h) means for removing said slag particulates from said furnace.

11. The apparatus of claim 10 wherein the furnace is a rotary hearth furnace having a rotatable hearth surface.

12. The apparatus of claim 11, wherein said hearth layer of refractory material further comprising a vitreous layer of iron oxide and silica compounds, said vitreous layer is placed on said layer of refractory material before said introducing means introduces said coating materials onto said hearth layer.

13. The apparatus of claim 10 wherein said means for introducing said mixture of coating material comprises a particle movement conveyor, said conveyor having the capability to introduce said coating material onto said hearth layer.

14. The apparatus of claim 10 wherein said mixture of coating materials comprises a material selected from the group consisting essentially of iron oxide compounds, silicate compounds, magnesium oxide compounds, silicon oxide compounds, aluminum oxide compounds, and carbon compounds.

15. The apparatus of claim 13, wherein said mixture of coating materials further comprises another layer of carbonaceous material, said carbonaceous material and said mixture of coating material introduced by said introducing means into said hearth layer.

16. The apparatus of claim 13, wherein said mixture of coating material further comprises a carbonaceous material, said carbonaceous material introduced by said introducing means onto said hearth layer before said iron oxide and carbon materials are placed onto said hearth layer.

17. The apparatus of claim 10, wherein said means for placing said iron oxide and carbon materials comprises a conveyor, said iron oxide and carbon materials are positionable by said conveyor onto said hearth layer.

18. The apparatus of claim 10, wherein said means for heating comprises a plurality of radiant heat sources providing heat at a temperature range of at least 1450° C. to about 1600° C., said radiant heat sources maintaining said hearth layer within said temperature range.

19. The apparatus of claim 10, wherein said means for heating further comprises a plurality of radiant heat sources providing heat at a temperature range of at least 1400° C. to about 1600° C. at said hearth layer inside said furnace.

20. The apparatus of claim 10, wherein said means for heating further comprises a plurality of radiant heat sources at temperatures of at least 1450° C. to about 1530° C. at said hearth layer inside said furnace.

21. The apparatus of claim 10, wherein said means for cooling said liquid iron and carbon globules on said hearth layer further comprises a cooling surface in close proximity to said hearth layer surface, said cooling surface including a cooling plate extended over said hearth layer.

22. The apparatus of claim 10, wherein said means for removing solid iron and carbon buttons comprises a discharge mechanism, said discharge mechanism including a conveyor to accept said solid iron and carbon buttons from said furnace.

23. A method for producing solid iron and carbon product from iron oxide material containing carbon compounds, comprising the steps of:
   (a) providing a furnace, said furnace providing a sub-hearth layer surface;
   (b) introducing conditioning materials including iron oxide compounds, carbon compounds, and silica compounds onto said sub-hearth layer surface;
   (c) heating said conditioning materials, forming a vitreous layer including at least iron oxide and silica compounds;
   (d) placing agglomerates containing iron oxide and carbon materials on said vitreous layer;
   (e) reducing said agglomerates containing iron oxide and carbon materials by heating;
   (f) forming liquid iron and carbon globules and slag particulates on said vitreous layer, with separating of said slag particulates on said vitreous layer;
   (g) cooling said liquid iron and carbon globules, forming solid iron and carbon buttons on said vitreous layer;
   (h) discharging said solid iron and carbon buttons from said furnace; and
   (i) removing said slag particulates from said furnace.

24. The method of claim 23, wherein said providing step further comprises providing a rotary hearth furnace having a rotatable hearth surface.

25. The method of claim 23, wherein said step of introducing conditioning materials further comprises providing additional conditioning materials selected from the group consisting essentially of magnesium oxide compounds, silicon oxide compounds, aluminum oxide compounds, iron oxide compounds, and carbonaceous compounds.

26. The method of claim 23, wherein said heating step further comprises heating said coating materials with a plurality of radiant heat sources providing heat at a temperature range of at least 1450° C. to about 1600° C.

27. The method of claim 23, wherein said reducing step further comprises exposing said iron oxide and carbon materials to a plurality of radiant heat sources providing heat at a temperature range of at least 1410° C. to about 1480° C. inside said furnace.

28. The method of claim 23, wherein said cooling step of said liquid iron and carbon globules further comprises providing a cooling surface near said vitreous layer, said cooling step cooling said liquid iron and carbon globules, creating iron and carbon solid buttons on said vitreous layer.

29. A method for producing iron product from iron oxide material containing carbon compounds, comprising the steps of:
   (a) providing a furnace, said furnace providing a sub-hearth layer surface;
   (b) introducing iron oxide compounds, carbon compounds, and silica compounds onto said sub-hearth layer surface;
   (c) heating said compounds, forming a vitreous hearth layer including at least iron oxide and silica compounds;
   (d) placing coating materials on said vitreous hearth layer, forming a coated vitreous hearth layer;
   (e) placing said agglomerates containing iron oxide and carbon materials on said coated vitreous hearth layer;
   (f) reducing said agglomerates containing iron oxide and carbon materials on said coated vitreous hearth layer;
   (g) forming liquid iron and carbon globules, and slag particles on said coated vitreous hearth layer;
   (h) cooling said liquid iron and carbon globules, forming solid iron and carbon buttons on said coated vitreous hearth layer separate from said slag particles;
   (i) discharging said solid iron and carbon buttons from said furnace; and
   (j) removing said slag particles from said furnace.

30. The method of claim 29, wherein said providing step further comprises providing a rotary hearth furnace having a rotatable hearth surface.

31. The method of claim 29, wherein said step of placing coating materials further comprises selecting said coating materials from the group consisting essentially of magnesium oxide compounds, silicon oxide compounds, aluminum oxide compounds, carbonaceous compounds, and iron oxide compounds.

32. The method of claim 29, wherein said heating step further comprises heating said compounds with a plurality of radiant heat sources providing heat at a temperature range of at least 1450° C. to about 1600° C.

33. The method of claim 29, wherein said reducing step further comprises exposing said iron oxide and carbon material to a plurality of radiant heat sources providing heat at a temperature range of at least 1410° C. to about 1480° C. inside said furnace.

34. The method of claim 29, wherein said cooling step of said liquid iron and carbon globules further comprises providing a surface near said vitreous hearth surface, said surface cooling said liquid iron and carbon globules, creating solid iron and carbon buttons on said coated vitreous hearth layer before said discharging step.

* * * * *